Figure 1:
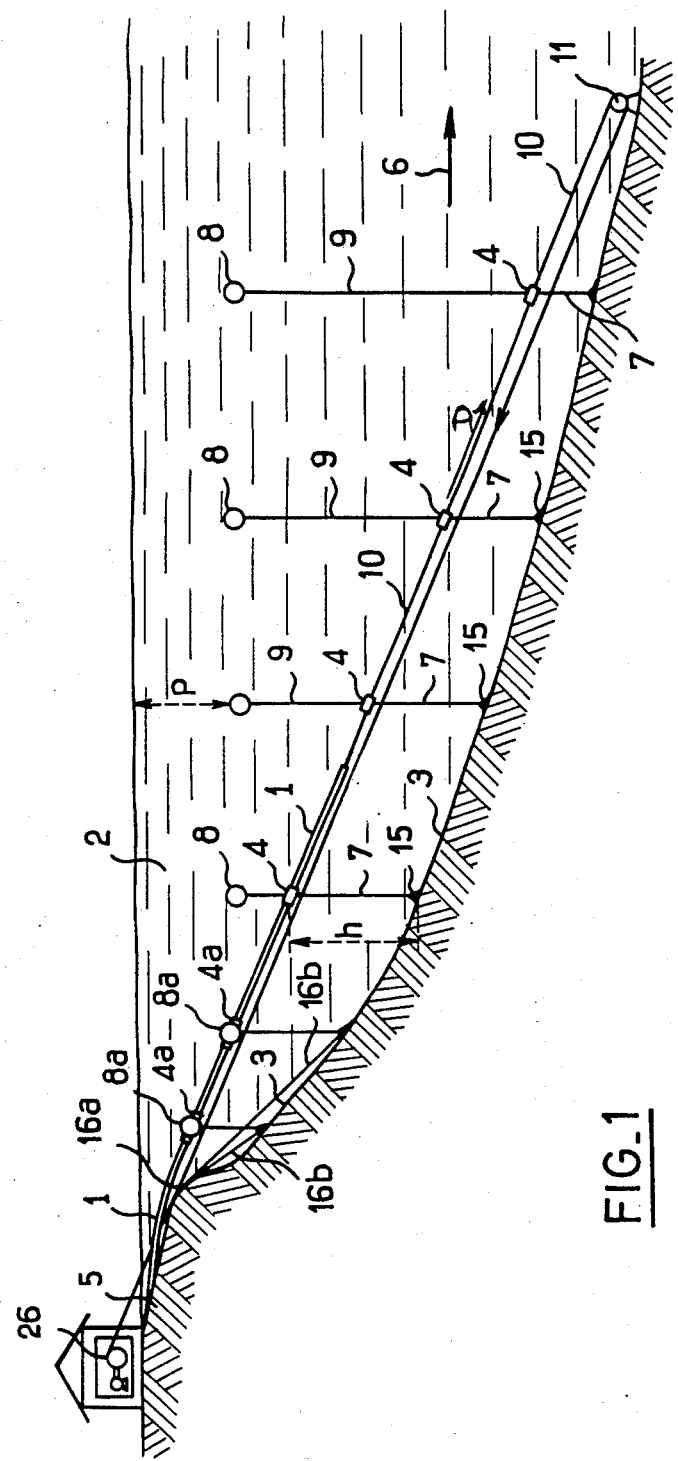

United States Patent [19]

Vilain

[11] Patent Number: 4,704,049

[45] Date of Patent: Nov. 3, 1987

[54] PROCESS AND ARRANGEMENT FOR INSTALLING A PIPELINE IN AN UNDERWATER ENVIRONMENT AND PIPELINE THUS PRODUCED

[75] Inventor: Robert Vilain, Maison-Alfort, France

[73] Assignee: Spie-Batignolles, Puteaux, France

[21] Appl. No.: 753,546

[22] Filed: Jul. 10, 1985

[30] Foreign Application Priority Data

Sep. 5, 1984 [FR] France ................ 84 13653

[51] Int. Cl.$^4$ ............................................. F16L 1/04
[52] U.S. Cl. .................................... 405/171; 405/158
[58] Field of Search ............... 405/158, 166, 168, 170, 405/171

[56] References Cited

U.S. PATENT DOCUMENTS

| | | |
|---|---|---|
| 1,603,106 | 10/1926 | Ferry et al. . |
| 1,871,034 | 8/1932 | Boucherot et al. . |
| 2,783,027 | 2/1957 | Gilbert . |
| 3,466,881 | 9/1969 | Lamy .............................. 405/171 X |
| 3,903,704 | 9/1975 | Spiridonov . |
| 4,138,853 | 2/1979 | Lamy . |
| 4,145,909 | 3/1979 | Daughtry . |
| 4,183,697 | 1/1980 | Lamy ............................... 405/170 |
| 4,265,566 | 5/1981 | Scodino . |
| 4,271,550 | 6/1981 | Joubert et al. . |
| 4,388,023 | 6/1983 | Cochrane . |
| 4,422,799 | 12/1983 | Green et al. . |

FOREIGN PATENT DOCUMENTS

| | | |
|---|---|---|
| 637656 | 5/1928 | France . |
| 1271062 | 7/1961 | France . |
| 2242627 | 3/1975 | France . |

*Primary Examiner*—David H. Corbin
*Attorney, Agent, or Firm*—Young & Thompson

[57] ABSTRACT

The pipeline (1) installed in an underwater environment (2) is engaged in a series of guides (4) placed above the seabed (3). These guides (4) are spaced from each other along a substantially straight-line direction (D) from land (5) towards the open sea (6). These guides (4) are connected by cables (7) to the seabed (3) and suspended from floats (8) placed at a sufficient depth (p) to minimize storm effects. Use particularly for installing a pipeline for withdrawing cold water from the depths of the sea to feed a tidal-thermal power station.

8 Claims, 6 Drawing Figures

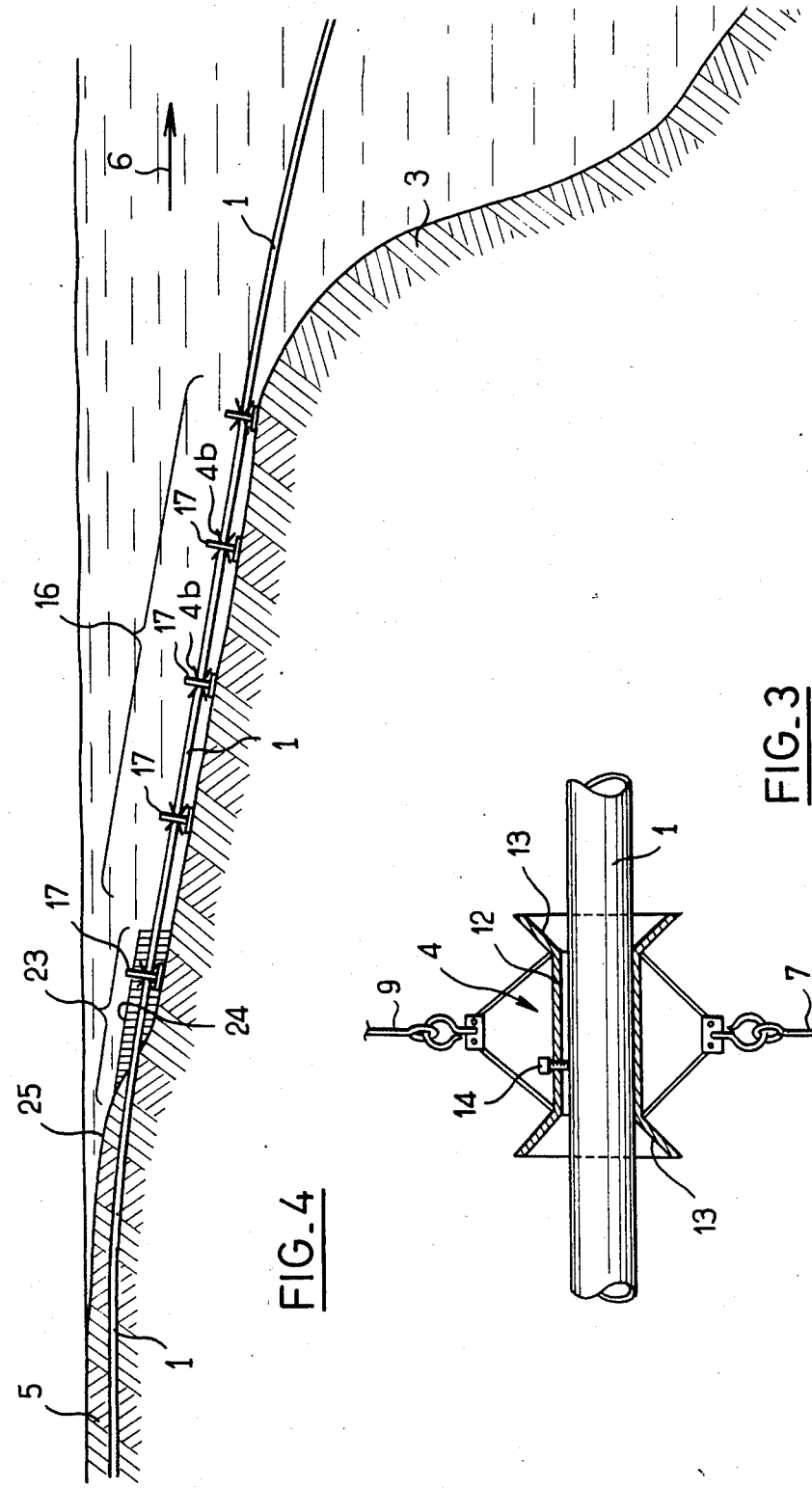

PROCESS AND ARRANGEMENT FOR INSTALLING A PIPELINE IN AN UNDERWATER ENVIRONMENT AND PIPELINE THUS PRODUCED

The present invention relates to a process and an arrangement for installing a pipeline in an underwater environment.

The invention is also aimed at a pipeline installed in an underwater environment, particularly by means of the abovementioned process or arrangement.

The invention is aimed particularly at installing at a great depth (approximately 1,000 metres) a pipeline intended to withdraw cold seawater having a constant temperature of the order of +4° C. for feeding the condensers of a power station known as a tidal-thermal power station, installed on land and utilizing the temperature difference between the cold water withdrawn in this way and that of the surface water to produce energy.

Since this temperature difference is relatively small, it is necessary to employ high flowrates and consequently large-diameter pipelines (2 to 10 metres).

Because of these large diameters, such pipelines are very difficult to handle and are highly sensitive to the effects of rough seas.

Many attempts have been made to install such pipelines in an undersea environment. All these attempts have ended in a setback, particularly because of the difficulties presented by the effets of a storm on such pipelines and by the generally little-known relief of the seabed.

The aim of the present invention is to provide a process for installing a pipeline in an underwater environment, which permits independence from the relief of the seabed, the use of pipelines with large diameters, and securing excellent reliability and safety of the installation, the use of this process being, furthermore, simple and relatively low in cost.

According to the invention, this process is characterized by the following steps:

a series of means for guiding the pipeline, which are spaced out from each other along a substantially straight-line direction going from land towards the open sea, are placed at a height above the seabed which is sufficient to avoid any contact between the pipeline and this seabed, these guidance means are connected by cables to the seabed, these guidance means are suspended from floats placed at a sufficient depth to minimize storm effects, a cable is engaged in the guidance means from land towards the open sea, the pipeline is linked to this cable and, the pipeline is pulled from land towards the open sea, so that this pipeline is engaged successively in the various guidance means and is supported by the latter.

This process can be utilised whatever the relief of the seabed, given that the height of the guidance means can be readily adjusted by modifying the length of the cables connected to the seabed.

Furthermore, given that the floats are placed at a sufficient depth, a storm has practically no effect on these floats and on the pipeline, so that the latter does not run the risk of being destroyed.

Furthermore, by virtue of the traction cable and the guidance means which are suitably aligned, laying of the pipeline is greatly facilitated and does not require excessively powerful means of traction, because the pipeline has practically zero weight in the submerged state, so that no excessive friction is produced between this pipeline and the guidance means.

Moreover, the process according to the invention can be employed in practice whatever the state of the sea, because this process does not require the immobilization of floating equipment on the sea surface.

According to another feature of the invention, the arrangement for using the abovementioned process incorporates a series of means for guiding the pipeline which are placed at a height above the seabed which is sufficient to avoid any contact between the pipeline and this seabed, which are spaced out from each other along a substantially straight-line direction going from land towards the open sea, these guidance means being connected to the seabed by cables and suspended from floats placed at a sufficient depth to minimize storm effects, a cable intended to be engaged successively in the guidance means from land towards the open sea and linked to the end of the pipeline, and means for pulling this cable from land towards the open sea so that the pipeline can engage successively in the various guidance means and be supported by them.

Such an arrangement makes use of hardware and means which are particularly simple, relatively low in cost and easy to handle.

According to a third feature of the invention, the pipeline installed in an underwater environment has the individual characteristic of being engaged in a series of guidance means placed above the seabed and spaced out from each other out along a substantially straight-line direction going from land towards the open sea, these guidance means being connected by cables to the seabed and suspended from floats placed at a sufficient depth to minimize storm effects.

Other individual characteristics and advantages of the invention will also become apparent from the following description.

Figure 2:
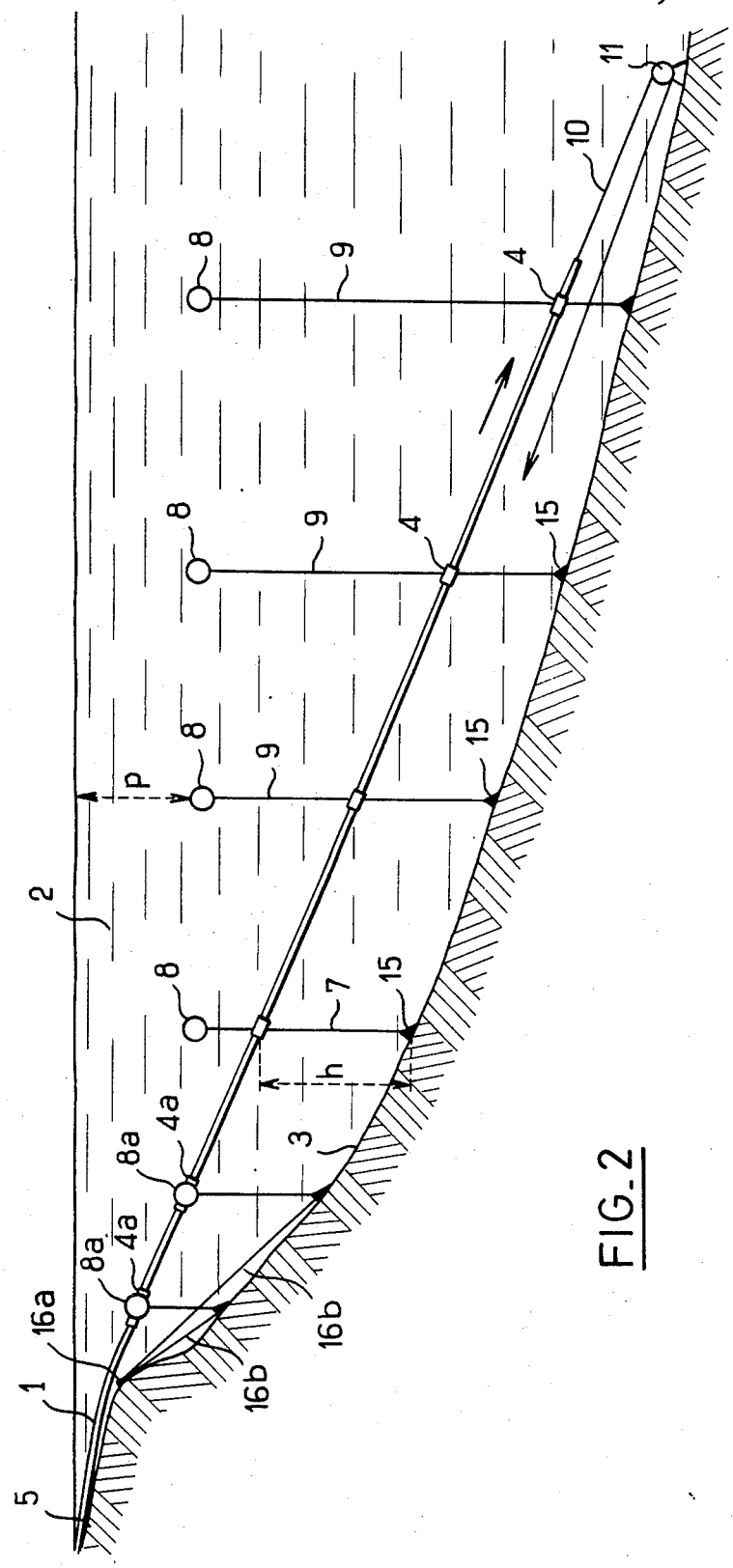
Figure 5:
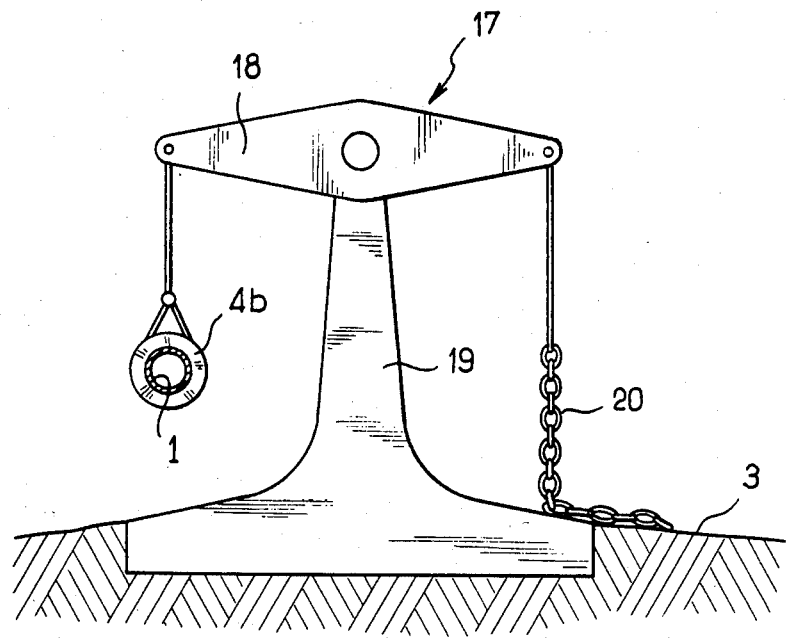
Figure 6:
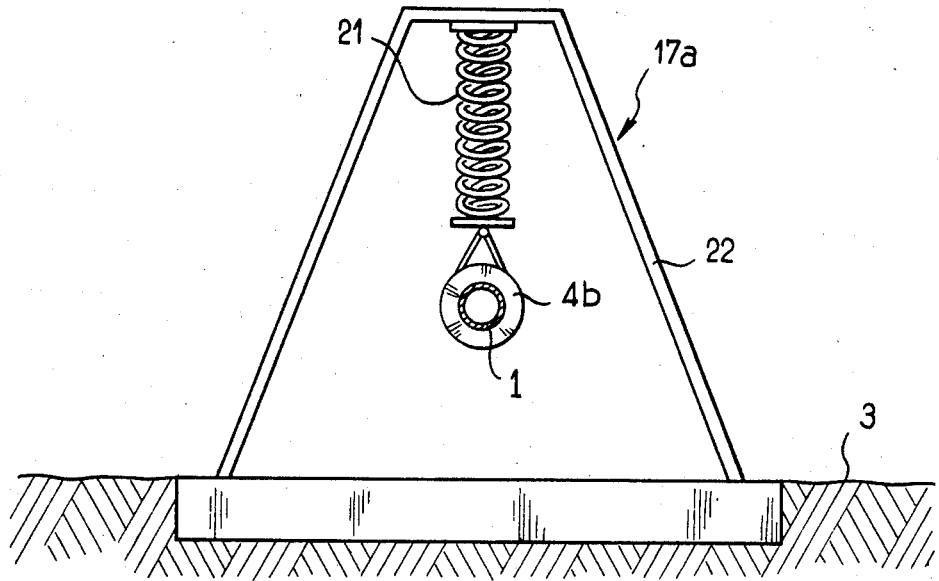

In the attached drawings, given by way of non-restrictive examples:

FIG. 1 is a diagram, in lengthwise section of the seabed and of the underwater environment, showing the utilization of the process and of the arrangement according to the invention, the pipeline being partly engaged in the guidance means, FIG. 2 is a diagram similar to FIG. 1, the pipeline being almost completely installed, FIG. 3 is a view in lengthwise section of a sleeve for guiding the pipeline, FIG. 4 is a diagram in lengthwise section of the seabed and of the water environment showing the anchoring of the pipeline in the region close to land, FIG. 5 is an elevation view of a first version of a pipeline support employed in the region shown in FIG. 4, FIG. 6 is an elevation view of a second version of the pipeline support.

With reference to FIGS. 1 to 2, the process for installing a pipeline 1 in an underwater environment 2 comprises the following steps:

a series of means for guiding 4 the pipeline 1, which are spaced out from each other along a substantially straight-line direction D going from land 5 towards the open sea 6, and forming a slope with the water surface, are placed at a height h above the seabed 3, which is sufficient to avoid any contact between the pipeline 1 and this seabed 3, these guidance means 4 are connected by cables 7 to the seabed 3, these guidance means 4 are suspended from floats 8 placed at a sufficient depth p to minimize storm effects, a cable 10 is engaged in the guidance means 4 from land 5 towards the open sea 6, the pipework 1 is linked to this cable 10 and this pipeline 1 is pulled from land 5 towards the open sea 6, so that this pipeline 1 engages successively in the various guidance means 4 and is supported by the latter.

In the arrangement illustrated by FIGS. 1 and 2, the means for pulling the cable 10 from land towards the open sea 6 incorporate a cable return pulley 11 anchored to the seabed 3 beyond the last guidance means 4 at a point situated on the alignment of these guidance means and a traction device 26 situated on land and connected to the cable 10, which is wound around this return pulley 11.

As can be seen in FIG. 3, the guidance means 4 incorporate a sleeve 12 which is suitable for receiving the pipeline 1. This sleeve 12 incorporates two widened ends 13 which facilitate the engagement of the cable 10 in the sleeve 12 in the event of a slight misalignment of the guidance means 4.

The sleeve 12 can incorporate a device such as bolts 14 to lock the pipeline 1 axially relative to the guidance means 4.

The guidance means 4a nearest to land 5 and situated at a low depth can be integrated with the floats 8a.

In the example shown in FIGS. 1 and 2, the guidance means 4 and 4a are connected by cables 7 to blocks 15 made, for example, of concrete and laid on the seabed 3. These blocks 15 are sufficiently heavy to compensate the upward pull forces exerted by the floats 8 and 8a. In the region with a steep slope and rubble, the blocks 15 are anchored at a point 16a close to land 5 by cables 16b.

In FIG. 4 it can be ssen that in a shallow region 16 close to land 5 the pipeline 1 is engaged in guidance means 4b connected to supports 17 anchored to the seabed 3, by means which permit a degree of freedom of movement of the pipeline 1 to compensate storm effects.

These supports 17 can be made as shown in FIG. 5. In this figure, the cable 1 engaged in its guidance means 4b is suspended from one of the ends of a lifting beam 18 jointed at its centre to a vertical structure 19. The other end of this lifting beam 18 is connected to a chain 20, a part of which lies on the seabed 3 and balances the assembly. By virtue of this arrangement, the pipeline 1 is continuously braced by progressive, known and restricted forces towards its mean position, while this pipeline 1 is allowed to move freely in all directions under the effect of external forces, such as those produced during a storm.

The same effect can be produced by means of the pendulum support 17a shown in FIG. 6. In this embodiment, the guidance means 4b in which the pipeline 1 is engaged is suspended from one or more springs 21 linked to a gateway 22 anchored to the seabed 3.

In the embodiment of FIG. 4, it can be seen, furthermore, that in the region 23 close to land 5, the pipeline 1 and the supports 17 are protected by walls 24 anchored to the seabed 3 and extending laterally on both sides of the pipeline 1. These walls 24 are produced, for example, by means of sheet piling driven into the seabed 3. These walls 24 are preferably extensively perforated on the open sea 6 side and full on the side of the part 25 in which the pipeline 1 is buried.

The principal advantages of the process, of the arrangement and of the pipeline just described are the following:

The involvement of marine floating equipment is very restricted and can be divided up in time, depending on circumstances (storm, fair weather).

The installation of the pipeline 1 can be carried out whatever the relief of the seabed 3.

The installation of the pipeline 1 does not involve, at any time during its laying a critical phase exposing the whole construction to inclement weather.

The installation thus offers a guarantee of reliability and safety which are exceptional in relation to that obtained in the solutions envisaged hitherto.

Understandably, the invention is not restricted to the examples which have just been described and numerous modifications can be introduced in these without departing from the scope of the invention.

Thus, the guidance means 4, 4a and 4b may be different from those described as examples.

Similarly, the locking means 14 may be different from those described.

Furthermore, the supports 17, 17a may be different from those described, provided that they permit a degree of freedom of movement to the pipeline 1 in case of a storm.

I claim:

1. Process for installing a pipeline (1) in an underwater environment (2), working entirely from land (5) without the use of any surface floating equipment permanently and directly connected to said pipeline, comprising, in a first preparatory phase:

placing a series of means (4) for guiding the pipeline (1) spaced from each other along a direction (D) from land (5) toward the open sea (6), at a height (h) above the seabed (3) which is sufficient to avoid any contact between the pipeline and said seabed, connecting said guiding means (4) by cables (7) to the seabed (3), suspending said guiding means (4) from floats (8) which are disposed at a depth (p) sufficient to minimize storm effects, engaging a cable (10) in the guidance means (4), linking the pipeline (1) to said cable (10); and, in an installation phase:

pulling the pipeline (1) toward the open sea (6) so that said pipeline is engaged succesively in the various guidance means (4) and is supported thereby.

2. Apparatus for installing a pipeline (1) in an underwater environment, working entirely from land (5) without the use of any surface floating equipment permanently and directly connected to said pipeline, comprising:

a series of means (4) for guiding the pipeline (1), which are disposed at a height (h) above the seabed (3) which is sufficient to avoid any contact between the pipeline and said seabed, and are spaced from each other along a direction (D) from land (5) toward the open sea (6), said guiding means (4) being connected by cables (7) to the seabed (3) and suspended from floats (8) which are disposed at a sufficient depth (p) to minimize storm effects, a cable (10) adapted to be engaged successively in the guidance means (4) and linked to the end of the pipeline (1), and means for pulling this cable (10), so that the pipeline may engage successively in the various guidance means (4) and be supported thereby.

3. Apparatus according to claim 2, in which the guiding means (4) include a sleeve (12) adapted to receive the pipeline (1).

4. Apparatus according to claim 3, in which the sleeve (12) has widened ends (13).

5. Apparatus according to claim 2, in which the guiding means (4) includes a device (14) for locking the pipeline relative to said guiding means.

6. Apparatus according to claim 2, in which the means for pulling the cable (10) includes a cable return pulley (11) anchored to the seabed (3) beyond the last guiding means (4) and in alignment with said guiding means, and a traction device, connected to the cable (10) and which is wound around said return pulley (11).

7. Apparatus according to claim 2, in which the guidance means (4a) which are the closest to land (5) and situated at a low depth, are integrated with the floats (8a).

8. Apparatus according to claim 2, in which the guidance means (4, 4a) are connected by cables (7) to blocks (15) laid on the seabed (3).

* * * * *